March 12, 1946. H. W. DONISTHORPE 2,396,412
METHOD AND MEANS FOR MAKING KNITTING NEEDLES
Filed Oct. 10, 1944 9 Sheets-Sheet 1

Inventor
H.W. Donisthorpe
By
Attorneys

March 12, 1946. H. W. DONISTHORPE 2,396,412
METHOD AND MEANS FOR MAKING KNITTING NEEDLES
Filed Oct. 10, 1944 9 Sheets-Sheet 5

Inventor
H. W. DONISTHORPE
By
Attorneys

March 12, 1946. H. W. DONISTHORPE 2,396,412
METHOD AND MEANS FOR MAKING KNITTING NEEDLES
Filed Oct. 10, 1944 9 Sheets-Sheet 6

Inventor
H. W. Donisthorpe
By
Attorneys

March 12, 1946. H. W. DONISTHORPE 2,396,412
METHOD AND MEANS FOR MAKING KNITTING NEEDLES
Filed Oct. 10, 1944 9 Sheets-Sheet 8

Inventor
H. W. Donisthorpe
By
Emny Holcombe & Derr
Attorneys

Patented Mar. 12, 1946

2,396,412

UNITED STATES PATENT OFFICE 2,396,412

METHOD AND MEANS FOR MAKING KNITTING NEEDLES

Henry Winton Donisthorpe, Leicestershire, England, assignor to F. N. F. Limited, Gloucester, England, a British company Application October 10, 1944, Serial No. 558,035
In Great Britain November 8, 1943

14 Claims. (Cl. 163—2)

In United States Patent No. 2,229,929 tubular knitting needles are described in which the needle hook is formed as an extension of a portion of the wall of a tubular shank. Such a needle operates in conjunction with a tongue which, in the operation of the machine, undergoes to-and-fro movement with respect to the needle between a position in which the tip of the tongue is concealed in the needle shank and a position in which the tip of the tongue overlaps the needle hook, the tubular needle shank serving accurately to guide the tongue at all times during each cycle of operations. For fine work such needles have to be constructed in very small sizes so that the wall of the tube is extremely thin and the material available for forming the hook as a direct extension of a portion of the tube wall is very small. In United States Patent No. 2,237,480, therefore, it is proposed to make the portion of the tube wall at which the hook emerges thicker than the other portions of the tube wall so that sufficient material is available for a hook that will withstand the stresses involved in the operation of the needle. One way in which the wall of the tube may be thickened is by brazing or soldering a metal strip along one side of the tube, the hook being formed on the strip rather than on the tube itself. This method, however, involves a certain amount of complication in the manufacturing process, and, as these needles have to be produced in large quantities, it is highly desirable for the manufacturing process to be as simple as possible. An aim of the present invention, therefore, is to provide a tubular machine knitting needle having a tubular shank with an integral hook which may be easily manufactured in large quantities and, if required, in very small sizes, while providing a hook which is adequate for practical conditions.

The present invention provides a method of manufacturing a machine knitting needle, wherein one end of a tube is flattened, a substantial longitudinal portion of the flattened end removed, leaving an edge thereof, and the end of the projection constituted by the said edge bent to form a hook. The flattening and subsequent removal of a substantial portion of the flattened portion may alone be sufficient to provide a projection on which a hook can be properly positioned, but advantageously the end of the tube, before being flattened, may be offset to lie parallel to and to one side of the body of the tube. A grinding operation may be employed to open one side of the tube at the point where the associated tongue is to pass out of the needle shank to the point at which it is to overlap the hook.

The invention also provides a machine for performing the aforesaid method, the machine having means for carrying a tube to units for flattening the end of the tube, shearing away a portion of the flattened end, and bending the remainder of the flattened end to form a hook.

The initial tube may be of circular cross-section or it may be of elliptical or similar cross-section. The needles are particularly suitable for warp knitting machines but they may also be used in circular and like machines in which the needles are individually mounted in tricks. In the latter case each needle shank is provided with a butt to be acted upon by the appropriate cam track, and the associated tongue is also provided with a butt for cooperation with another cam track.

In order that the invention may be clearly understood and readily carried into effect a method and a machine in accordance therewith will now be described, by way of example, with reference to the accompanying drawings, in which:

Figure 5 is a section on the line V—V in Figure 4, Figures 6 and 7 are respectively a side elevation and a plan of the tube after a shearing operation has been performed thereon, Figure 8 is a section on the line VIII—VIII in Figure 6, Figures 9 and 10 are respectively an elevation and a plan of the tube of Figures 6 to 8 after a grinding operation has been performed thereon, Figure 11 is a section on the line XI—XI in Figure 9, Figure 18 is a section on the line XVIII—XVIII in Figure 17, Figures 19 and 20 are respectively a side elevation and a plan of a unit in the machine for forming a tube first to the shape shown in Figure 3 and then to the shape shown in Figures 4 and 5, Figure 21 is a section on the line XXI—XXI in Figure 19, Figures 22 and 23 are respectively a side elevation and a plan of a unit in the machine for performing a shearing operation on the tube to convert it from one shape shown in Figures 4 and 5 to that shown in Figures 6 to 8, Figure 24 is a section on the line XXIV—XXIV in Figure 22, Figures 25 and 26 are respectively a side elevation and a plan of a unit in the machine for grinding the tube so as to convert it from the shape shown in Figures 6 to 8 to that shown in Figures 9 to 11.

Figures 1, 2:
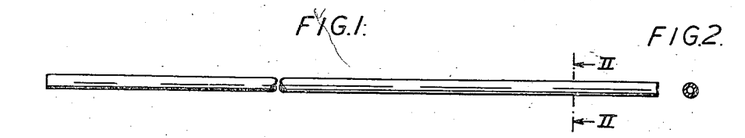
Figure 1 is a side elevation of an initial length of tube.
Figure 2 is a section on the line II—II in Figure 1.

The manufacture of a machine knitting needle is begun by taking a simple tube of circular cross-section as shown in Figures 1 and 2. This tube may have very small cross-sectional dimensions so that the said figures may be regarded as showing it on a greatly enlarged scale. For example, for a 28 gauge warp knitting machine (i. e. a machine having a needle density of twenty-eight needles to the inch along the needle bar) the length of tube would have an outside diameter of 0.018 inch and a wall thickness of 0.003 inch.

Figure 3:
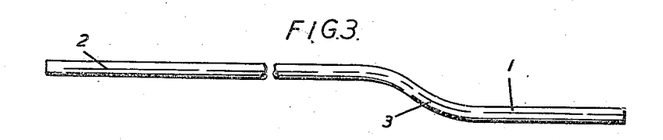
Figure 3 is a side elevation of the length of tube after it has been subjected to a bending operation.
Figure 4:
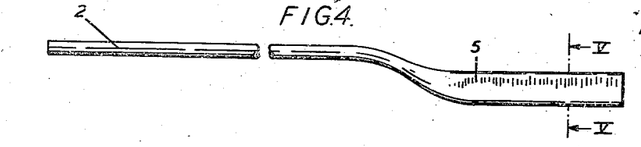
Figure 4 is a side elevation of the length of tube of Figure 3 after it has been subjected also to a flattening operation.
Figure 5:
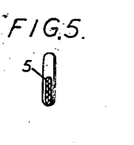
Figures 6, 7, 8, 9, 11:
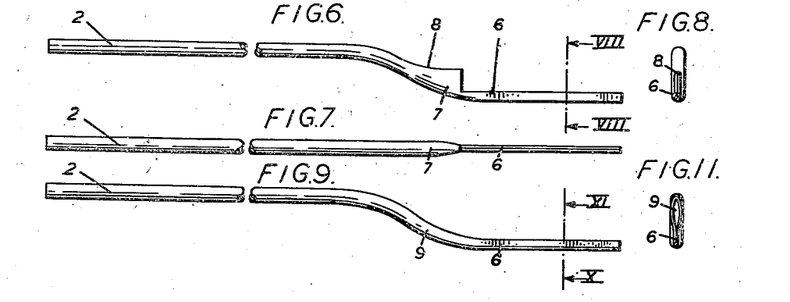
Figure 10:
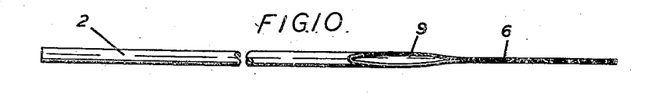
Figure 12:
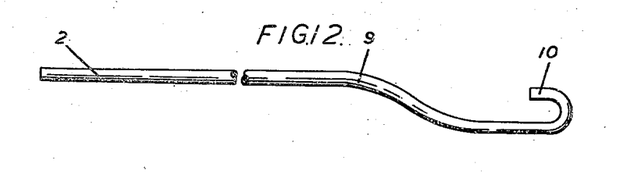
Figure 12 is an elevation of the tube of Figures 9 to 11 after it has been formed with a hook to provide a substantially finished machine knitting needle.

The first operation on the length of tube is to bend it to the cranked shape shown in Figure 3 so that one end 1 of the tube is offset and joined to the main body 2 by an inclined portion 3. The end 1 is then flattened so that it takes a shape 5 (Figures 4 and 5) resembling the blade of an oar. Next a substantial amount of the flattened portion is sheared away so as to leave a narrow projection 6 (Figures 6 to 8). The overall cross-section of this projection 6 is less than that of the main body of the tube but, owing to the fact that, as viewed in Figure 7, it comprises two thicknesses of the tube wall, the projection 6 is sufficiently robust to be formed with a satisfactory hook. It will be observed that the projection 6 is joined to the body 2 of the tube by a portion 7 which expands, as viewed in Figure 7, and comprises the inclined portion 3 of Figure 3 as modified by the flattening of Figure 4. The portion 7 includes a fin 8 which is a remnant of the blade-shaped part 5 (Figure 4). The next step is, therefore, to grind away this fin 8 so as completely to remove it and open the wall of the tube so that it takes the shape shown in Figures 9 to 11. This shape is such that the projection 6 is joined to the body 2 by an inclined and slightly tapered trough-shaped part 9. The grinding is followed by a polishing operation to remove any roughness due to the grinding. Finally the projection is bent to provide the hook 10 (Figure 12). The needle is now finished except for such heat treatment and final polishing as may be necessitated by the material from which the needle is made. One very suitable material for the needle is 0.6% to 0.7% carbon steel.

The needle is of the nature of those described in patent specifications Nos. 2,229,929 and 2,237,480 and a detailed description of its manner of use is unnecessary except to say that, when mounted in a knitting machine, the body 2 of the needle serves as a tubular guide for a tongue in the form of a wire or fine tube, and, in the operation of the knitting machine, both the needle and the tongue are moved to-and-fro in timed relationship between positions in which the tip of the tongue is concealed in the needle shank or body 2 and in which the tongue projects through the trough-shaped part 9 far enough for its tip to overlap the hook 10.

The machine shown in Figures 13 to 32 is designed automatically to perform the operations described above with reference to Figures 1 to 12. For this purpose the machine is furnished with five forming units A, B, C, D and E (Figures 13 and 14) to which lengths of tube, previously cut to the appropriate length, are carried in succession. These units operate simultaneously so that five tubes are acted on in each cycle of the machine, each tube being in a different stage in its development from a simple tube to the machine needle shown in Figure 12, and five cycles of the machine are required to form a machine needle from any one tube. It will be appreciated, therefore, that the lengths of tube have to be carried through the machine in steps and for this purpose they are mounted in succession in vices 11 carried by and equi-distantly spaced along an endless chain 12 mounted on a pair of sprockets 13 and 14. The sprocket 13 is fixed to a spindle 15 journaled in a bearing 16 (Figures 14 and 15) mounted on the machine frame. At its other end the spindle 15 carries a ratchet assembly 17 which, being exactly the same as a bicycle "free-wheel," requires no further description. The peripheral sprocket teeth on the assembly 17 mesh with a length of chain 18 (Figure 15), as used on a bicycle, fixed in an arcuate groove in a flange 19 (Figure 14) on a rocking member 20 mounted on a fixed journal 21. The member 20 is formed with an extension 22 carrying a roller 23 which is maintained in engagement with the periphery of a cam 24 by a spring 24ª acting on the member 20. The cam 24 is rotated uniformly during the operation of the machine, undergoing one revolution for each machine cycle, and it is shaped so that, at the beginning of each cycle, it causes the member 20 to rock to-and-fro. While the cam 24 permits the spring 24ª to swing the member 20 downwards the ratchet assembly 17 is ineffective but, when the cam 24 swings the member 20 in the reverse direction, the ratchet assembly 17 causes the sprocket 13 to feed the upper run of the chain 12 to the left as viewed in Figure 13 an amount equal to the distance between any two adjacent vices 11, which distance corresponds to the spacing of the forming units A . . . E. The sprocket 14 is fixed to a spindle 26 freely mounted in a journal 27 on the machine frame.

Figure 14:
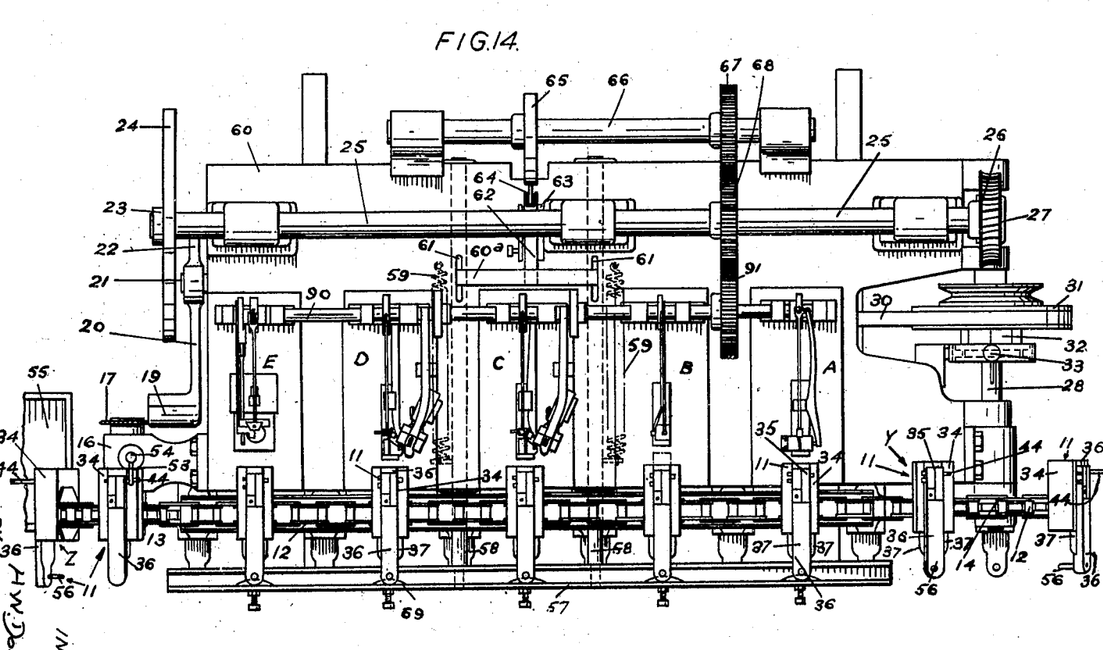
Figure 14 is a plan of the machine of Figure 13.
Figure 15:
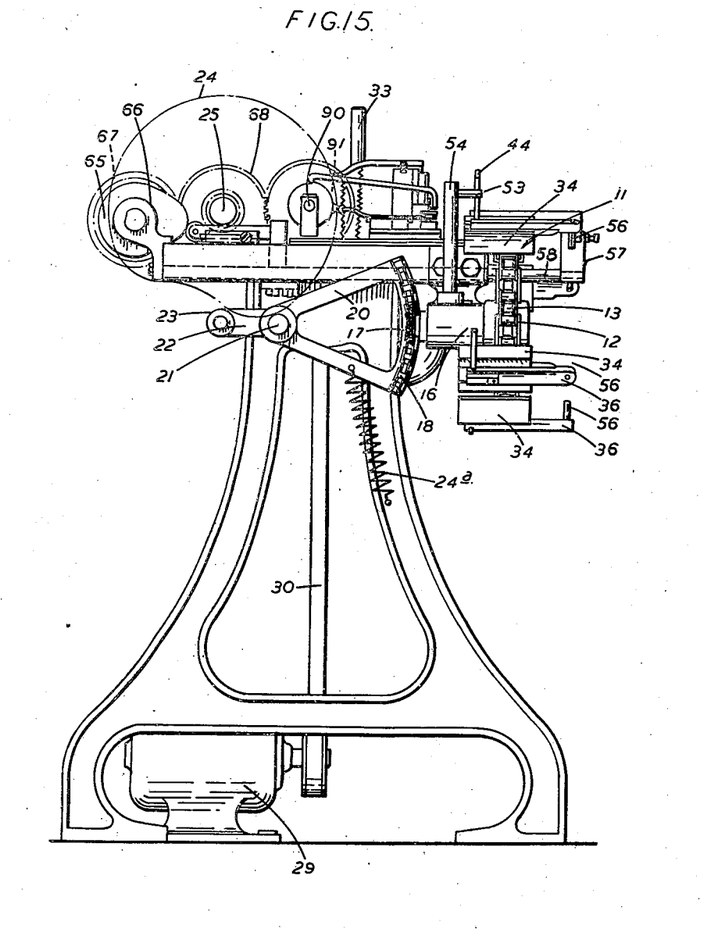
Figure 15 is an end elevation of the machine of Figures 13 and 14 as viewed from one end.
Figure 16:
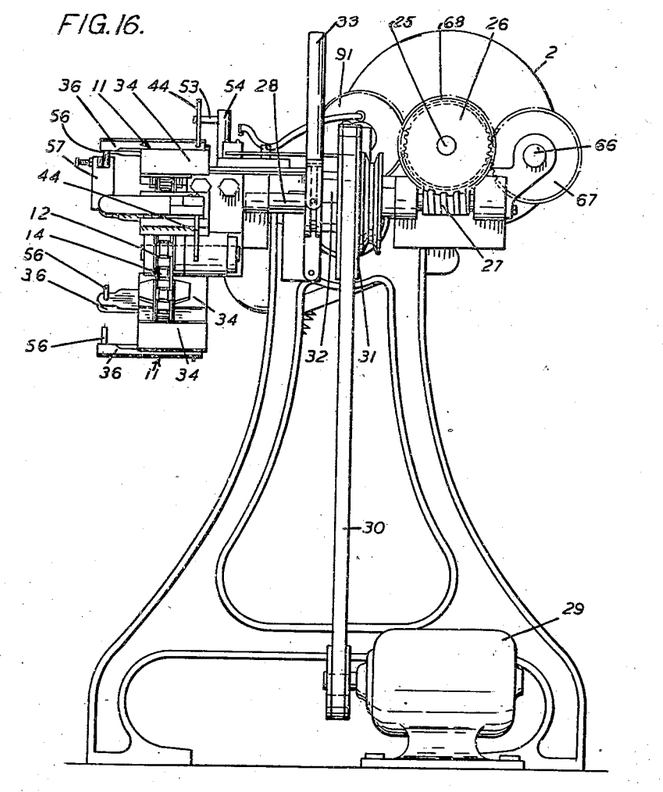
Figure 16 is an end elevation of the machine as viewed from the other end.

As shown in Figure 14 the shaft 25 extends substantially from end to end of the machine and, at its end remote from the cam 24, carries a worm wheel 26 in mesh with a worm 27 on a shaft 28 driven by an electric motor 29, connected by a belt 30 to a pulley wheel 31 connected by a dog clutch 32 to the shaft 28. The dog clutch 32 is of conventional design and may be operated at will by a handle 33 to stop the machine.

Figure 18:
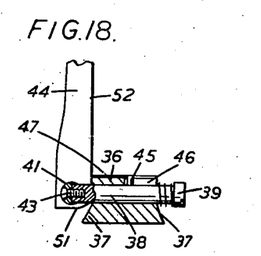

Each of the vices 11 comprises a base member 34 secured to the chain 12 and formed with a guide channel 35 in which a slide 36 is mounted for movement at right angles to the length of the chain towards and away from the units A . . . E. The slide 36 is shaped along each side 37, as shown in Figures 18, to fit undercut grooves at the sides of the channel 35. Above the channel 35 the slide 36 carries two transverse rods 38 formed with heads 39 and mounted to slide longitudinally in corresponding bores in the slide 36.

Compression springs 40 are interposed respectively between the heads 39 and the adjacent side of the slide 36. Beyond the opposite side of the slide 36 the rods 38 are joined together by a bar 39 having a circular cross-section at its centre but formed at its ends with flat faces 42 which bear against the ends of the rods 38, the bar 41 being secured to the rods 38 by screws 43. A lever 44 is mounted to swing to-and-fro, between the rods 38, on the bar 41, the lever 44 being formed with a circular aperture which fits the central portion of the bar 41.

Figure 17:
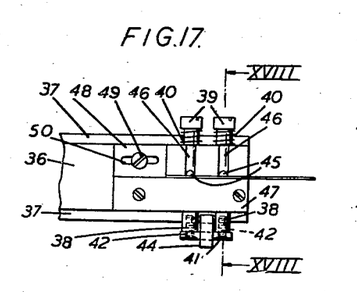
Figure 17 is a plan of a detail.

Each of the rods 38 carries an upstanding pin 45 and each such pin lies in a transverse groove 46 formed in, and extending half-way across, the slide. On the other half of the slide 36 is mounted a plate 47 and this, together with the two pins 35, constitute the jaws of the vice. Thus, when the jaws of the vice are closed, as shown in Figures 17 and 18, and if a length of tube X, similar to that described above with reference to Figures 1 and 2, has been placed between them, they grip the tube, the latter being held between one edge of the plate 47 and the pins 45. So that the length of the tube that projects beyond the vice may be accurately determined, the slide 36 carries a second plate 48 against the front edge of which the tail end of the tube X is located. The plate 48 is secured to the slide 36 by a screw 49 passing through a slot 50 which permits of adjustment of the plate 48 along the slide 36.

Figure 13:
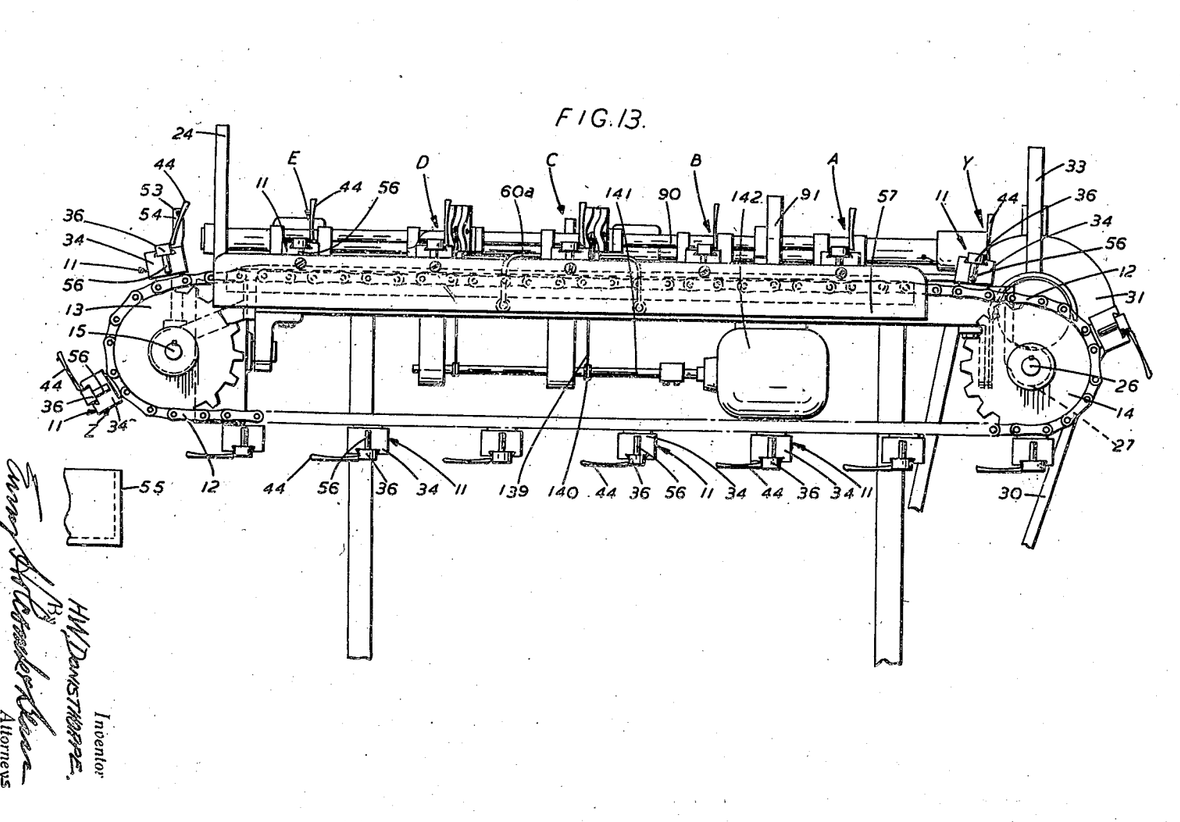
Figure 13 is a front elevation of a machine for performing on a tube the operations described with reference to Figures 1 to 12.

It will be observed in Figure 13 that those vices 11 that are idle and lie beneath the chain 12 have their levers 44 horizontal while those vices 11 that register with the forming units A . . . E have their levers 44 vertical. The reason for this is that the vice jaws are closed by swinging the lever 44 from the horizontal to the vertical position. Accordingly, when (in the step-by-step movement of the chain) a vice 11 reaches the position indicated by Y in Figures 13 and 14, the lever 44 is in the horizontal position (i. e., not in the position shown in those figures), and in the horizontal position the springs 40 act on the heads 39 of the rods 38 to hold the latter in positions in which the pins 45 are an appreciable distance from the adjacent edge of the plate 47. On reaching the position Y, however, the operator of the machine inserts a length of tube X between the edge of the plate 47 and the pins 45, and then swings the lever 44 upwards whereupon a curved edge 51 on the lever acts as a cam on the adjacent side of the slide 36, so that the handle, together with the bar 41 and the rods 38, is moved slightly to the left, as viewed in Figure 18, whilst the springs 40 are compressed and the length of tube X is gripped between the pins 45 and the plate 47. When the lever 44 has been moved to the vertical position of Figure 18 its flat edge 52 is held against the adjacent face of the slide 36 by the springs 40 tending to urge the rods 38 to the right. After each vice 11 has been carried past the forming units A . . . E, it reaches a horizontal pin 53 fixed to a pillar 54 and, in brushing past the pin 53, the lever 44 is caused to snap back to the horizontal position, whereupon the vice 11 on reaching a position Z (Figure 13) does not prevent the formed machine needle from falling into a receptacle 55 in which the needles are collected in succession.

When, in the step-by-step movement of the chain 12, a vice 11 is carried into register with one of the forming units A . . . E, the slide 36 must be thrust forward to bring the free end of the tube X into operative position with respect to the unit. Then, after the tube has been acted on by the unit, the slide 36 must be drawn back so that the vice 11 is free to be moved laterally once more. For this purpose the outer end of each slide carries a pin 56 which, so long as the vice is on the top run of the chain 12, projects downwardly and, while in the vicinity of the forming units A . . . E, extends into a trough 57 carried by two rods 58 mounted to move longitudinally. Two springs 59 (Figure 14) tend to urge the rods towards the rear of the machine, the rods 58 and springs 59 being below a plate structure 60 on which the forming units A . . . E are mounted. The rods 58 are connected together by a member 60a which projects through slots 61 in the plate structure 60 and at its centre is mounted on a slide 62 arranged to reciprocate in a guide 63 and carrying a roller 64 maintained in contact with a cam 65 by the springs 59. The cam 65 is fixed to a shaft 66 geared by gears 67 and 68 to the shaft 25. Thus, when the machine is running, the cam 65 causes the trough 57 to move towards and away from the forming units while carrying the associated slides 36 to-and-fro in timed relationship with the other operations of the machine. To insure that the slides 36 are properly positioned with respect to the trough 57 when the latter is moving the slides 36 towards the forming units A . . . E, adjustable cams 69 are secured to the back wall of the trough 57 in register with the forming units A . . . E and each time the chain 12 comes to rest one of the slide pins 56 is in engagement with the centre of each of the cams 69.

Figure 19:
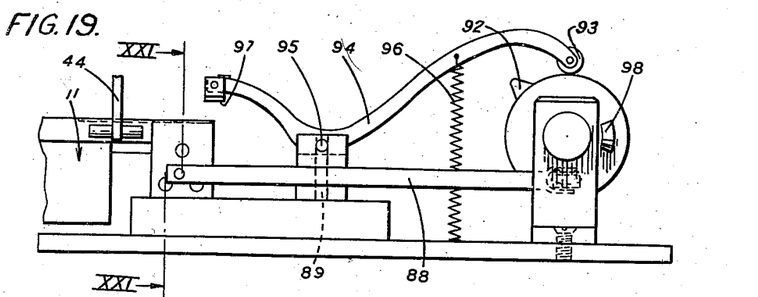
Figure 20:
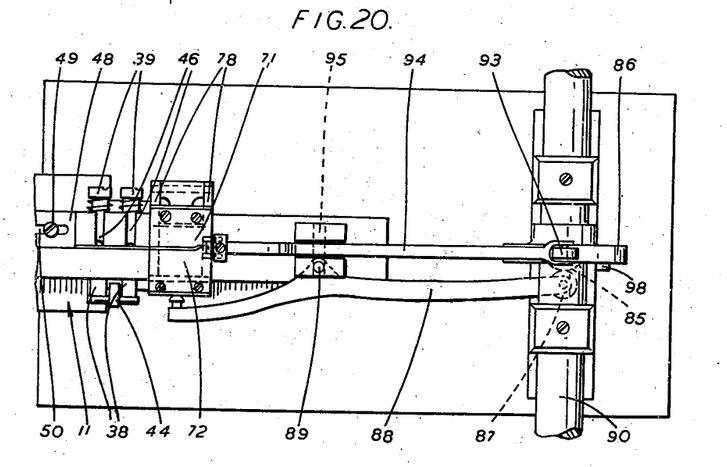
Figure 21:
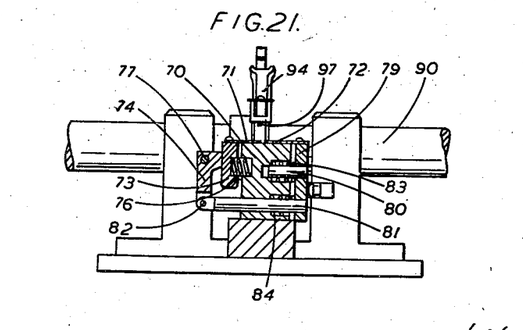

The forming units A . . . E will now be described in detail. The unit A is shown in Figures 19 to 21. When a vice 11 is moved forward to the position shown in Figures 19 and 20, the forward end of the tube X overlies an anvil 70. Two die plates 71 and 72 lie above the anvil 70 and when the tube X moves over the anvil 70, these plates are separated somewhat more than when they are in their active positions shown in Figures 19 and 20. The die plate 71 is secured to a member 73 bearing against a lever 74 on one side and, on the other side, against a compression spring 76 interposed between the member 73 and the anvil 70. The lever 74 is mounted on a spindle 77 carried by ears 78 extending from the anvil 70. The die plate 72 is fixed to a member 79 carrying rods 80 and 81 that project into bores in the anvil 70. The rod 81 passes through the anvil to the lever 74, to which it is pivoted at 82. Compression springs 83 and 84 are interposed between the anvil 70 and the member 79.

When the initial tube has been positioned over the anvil 70 and between the die plates 71 and 72, a cam 85 on a face of a cam disc 86 acts on a roller 87 at one end of a lever 88 to turn the latter about a pivot 89 and cause its remote end to press the member 79 inwards towards the anvil 70 against the springs 83 and 84. Simultaneously the rod 81 turns the lever 74 in a clockwise direction, as viewed in Figure 21, to press the member 73 inwards towards the anvil 70 against the compression spring 76. Thus, the die plates 71 and 72 converge on the tube X and bend it to the form shown in Figure 3.

The cam disc 86 is fixed to a shaft 90 which has a gear 91 in mesh with the gear 68 so that it rotates continuously during the operation of the machine. When the cam 85 has passed the cam roller 87, the springs 76, 83 and 84 cause the die plates 71 and 72 to separate and soon afterwards a cam 92 on the periphery of the cam disc 86 lifts a roller 93 at one end of a lever 94 to turn the latter about a pivot 95 against the action of a spring 96. Accordingly, a narrow die 97 on the lever 94 is pressed on the end of the tube to flatten it and thereby convert it substantially to the shape shown in Figures 4 and 5. Then, after the cam 92 has permitted the spring 96 to raise the die 97, a cam 98 on the face of the cam disc 86 acts on the lever 88 to cause the die plates 71 and 72 to approach each other once more to true the flattened end of the tube X. Owing to the fact that the end of the tube X has now been widened by the flattening operation, the cam 98 is shaped so as to move the die plates slightly less than they are moved by the cam 85. When the cam 98 has moved beyond the roller 87 so that the die plates 71 and 72 have receded from each other once more, the vice 11 can withdraw the tube X from between the die plates and the tube is then carried to the unit B.

Figure 22:
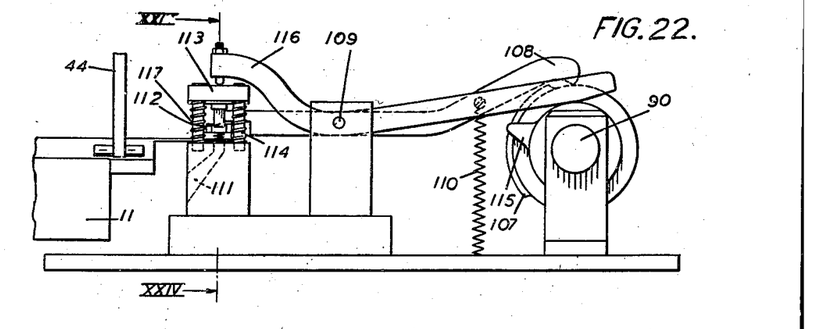
Figure 23:
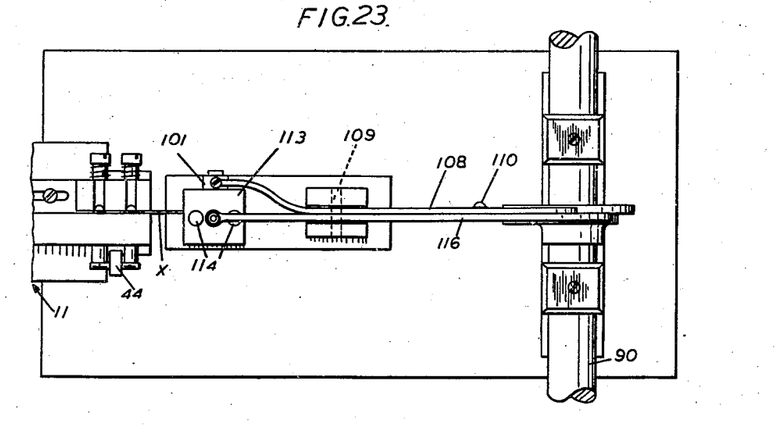
Figure 24:
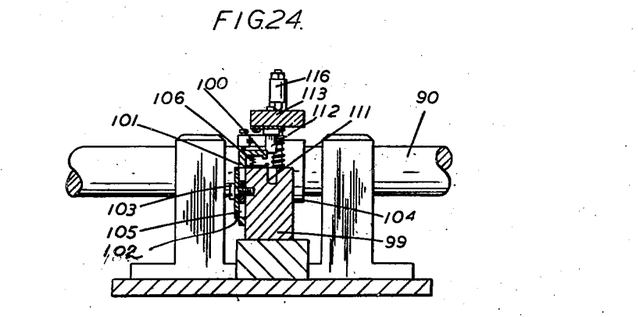
Figure 25:
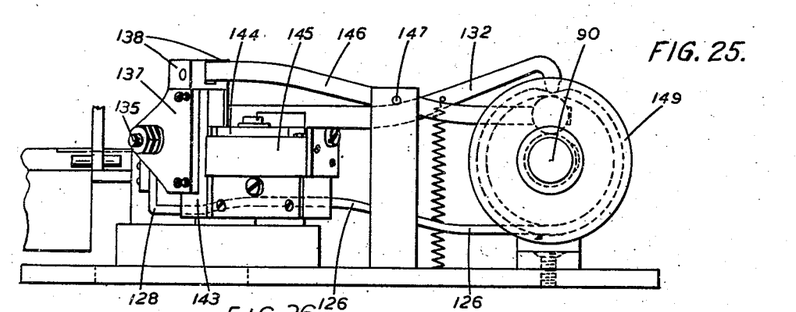
Figure 26:
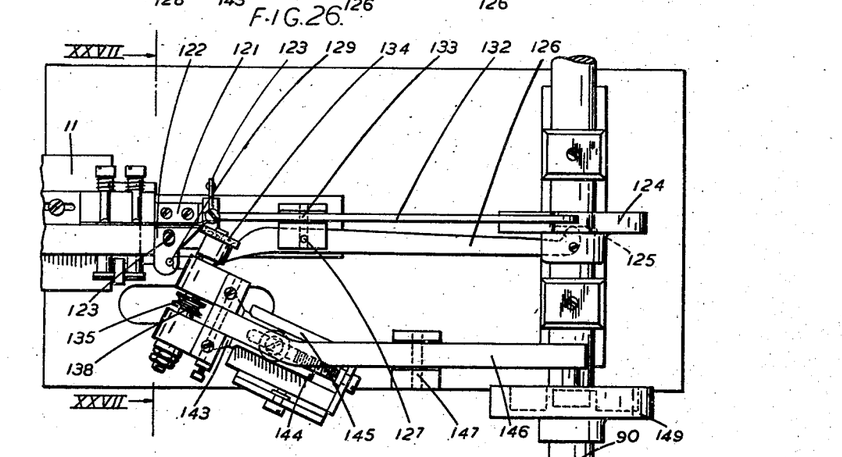
Figure 27:
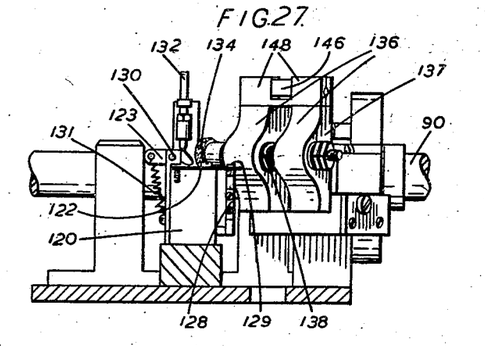
Figure 27 is a section on the line XXVII—XXVII in Figure 26.

The unit B is shown in detail in Figures 22 to 24. When an anvil 11 has registered with the unit B, the tube X is moved longitudinally until its flattened end lies over an anvil 99 and beneath a clamping surface 100. The clamping surface 100 is formed on an angle piece 101 mounted to slide vertically on the anvil 99. The vertical portion of the angle piece 101 is held against the anvil 99 by a plate 102 held between the head of a screw 103 and a washer 104. The angle piece 101 is formed with a slot 105 so that the up-and-down movement of the angle piece is not impeded by the washer 104. A spring 106 urges the angle piece upwards to its inactive position. When, however, the tube X has been positioned under the clamping surface 100, a cam 107 on the shaft 90 turns a lever 108 about a pivot 109 against the action of a spring 110 to depress the angle piece 101 and clamp the tube on the anvil 99. The clamping surface 100 only engages one edge of the flattened portion of the tube, leaving the main part of the flattened portion exposed for shearing to convert it to the shape shown in Figures 6 to 8. The exposed portion lies over a discharge chute 111 in the anvil through which the waste passes. The shearing is effected by a shear member 112 carried by a member 113 mounted to slide up and down on pillars 114. The shear member 112 is operated by a cam 115 on the shaft 90 which acts on a lever 116, pivoted at 109, to depress the member 113 against compression springs 117. When the cam 115 has passed the lever 108, the springs 117 raise the shear member 112 and then the cam 107 permits the spring 110 to turn the lever 108 clock-wise, as viewed in Figure 22, and the spring 106 to lift the clamping surface 100. The tube X is then carried to the forming unit C. The unit C is shown in Figures 25 to 28 and in this the fin 8 of Figure 6 is ground away. Each tube X is projected by the associated vice 11 over an anvil 120, the tube being to one side of a plate 121, and the tube is thereupon gripped by a plate 122 and a lever 123. The plate 122 is mounted to slide on top of the anvil 120, being guided thereon by a screw 123 which passes through a slot in the plate. The plate 122 is forced inwards to grip the main body 2 of the tube (see Figure 6) between itself and the plate 121 by a cam surface on the face of a cam disc 124 which acts on a lever 126 pivotally mounted at 127 and having an upstanding part 128 pivotally connected at 129 to the plate 122. When, however, a recess 125 in the cam surface is in register with the lever 126 the plate 122 can yield to permit the tube either to be inserted or withdrawn. The lever 123, which is pivoted at 130 (Figure 27) is pressed into engagement with the projection 6 (see Figure 6) on the tube, against the action of a spring 131, by a lever 132 pivoted about a horizontal axis 133 and acted on by the periphery of the cam disc 124. The fin 8 (Figure 6) is ground away by a small grinding wheel 134 mounted on a spindle 135 carried by two bearings 136 on a block 137. Between the bearings 136 the spindle 135 carries a pulley 138 connected by an endless elastic belt 139 (Figure 13) to a pulley 140 on a shaft 141 driven by an electric motor 142. For each tube X to be ground the grinding wheel 134 is moved once to-and-fro in a vertical plane, and for this purpose the block 137 is formed with a vertical channel having under-cut sides which fit a vertical guide member 143 integral with a block 144 which is adjustably mounted on a support 145. The guide member 143 remains stationary during the operation of the machine and the block 137 is moved up and down thereon by a lever 146 which is pivoted about a horizontal axis 147 and is pivotally connected to the block 137 between lugs 148 at the top thereof. The lever 146 is rocked about the axis 147 by a cam 149 on the shaft 90. A certain amount of play is provided in the pivotal connection between the lever 146 and the block 137 so as to permit the lever 146 to rock while the block 137 moves in a straight line path.

Figure 28:
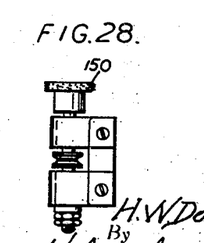
Figure 28 is a plan of a detail.
Figure 29:
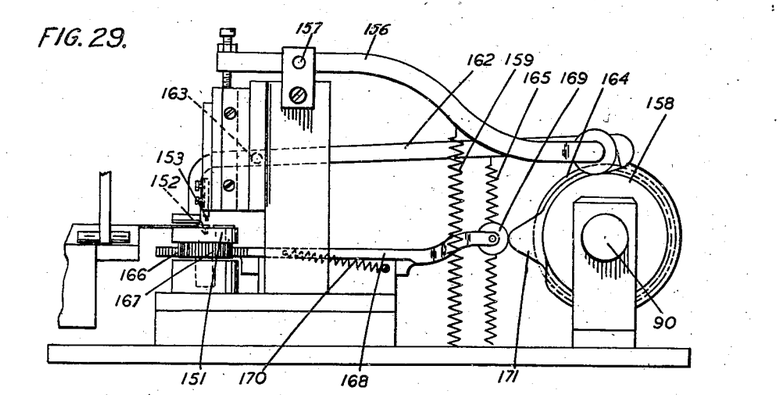
Figures 29 and 30 are respectively a side elevation and a plan of a unit in the machine for forming the shaped tube with a hook.
Figure 30:
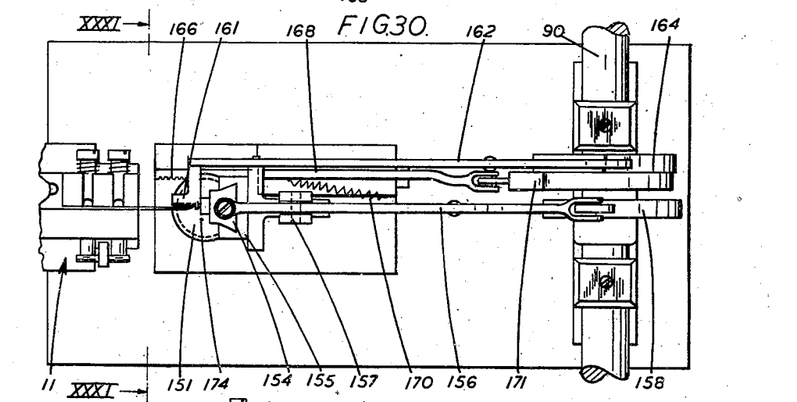
Figure 31:
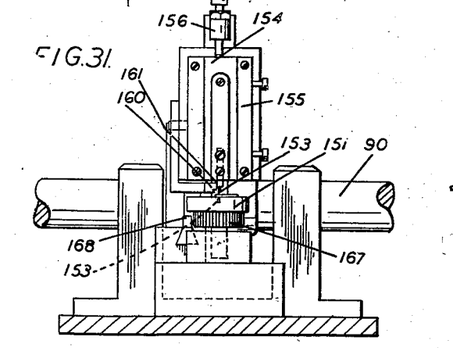
Figure 31 is a section on the line XXXI—XXXI in Figure 30.

The unit D is precisely the same as the unit C except that the grinding wheel 134 is replaced by a rotary wire polishing brush, such a brush 150 being shown in Figure 28 mounted on a block similar to the block 137.

The unit E is shown in Figures 29 to 32. Each vice 11 is arranged to cause a tube X to project over a turntable 151 so that the projection 6 lies just to one side of a small hole 152 at the centre of the turntable 151. The lower end of a pin 153 is projected into the hole 152, the pin being fixed to a slide 154 which is lowered in a guide 155, against the action of a spring (not shown), by a lever 156 pivoted at 157 and acted on by a cam 158 against which the lever is maintained by a spring 159. Furthermore, the tube X is held against moving across the turntable 151 in a direction away from the pin 153 by a shoulder 160 on a member 161, carried by a lever 162 pivoted at 163 and lowered onto the tube X by a cam 164 against which the lever is maintained by a spring 165. The turntable 151 is then swung to-and-fro about its axis by a rack 166 in mesh with a gear 167 fixed co-axially beneath the turntable 151.

Figure 32:
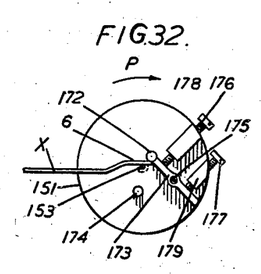
Figure 32 is a plan of a detail.

The rack 166 is formed on a member 168 mounted to reciprocate and carrying a roller 169 at its remote end. A spring 170 acts on the member 168 to maintain the roller 169 in engagement with a cam 171, the rotation of which imparts the required to-and-fro motion to the turntable. The cams 158, 164 and 171 are all on the shaft 99. In the return movement of the turntable 151 in the direction of the arrow P (Figure 32), the tip of the projection 5 is acted on by a curved surface 172 on a member 173 fixed to the turntable. A stop 174 is provided on the surface of the turntable and this engages the adjacent face of the member 161 to limit the movement of the surface 172 about the pin 153, so that a hook of the form shown by chain lines in Figure 32 is bent.

The member 173 is pivoted to the turntable 151 at 175 and is adjustably locked by screws 176 and 177 screwed into bushes 178 and 179 on the turntable and bearing on the member 173 on opposite sides of the pivot 175.

To enable the needle to be withdrawn from the turntable the pin 153 is raised above the hook.

I claim:

1. A method of manufacturing a machine knitting needle, comprising the steps of flattening one end of a tube, removing a substantial longitudinal portion of the flattened end leaving one longitudinal edge of said flattened end, also removing one side of the portion of said tube joining the main body thereof to said longitudinal edge to form an opening in said side, and bending said edge into the form of a hook with the tip of said hook pointing towards said opening.

2. A method of manufacturing a machine knitting needle, comprising the steps of bending a tube so that one end thereof lies to one side of and is parallel to the main body of said tube, said end being joined to said main body of said tube by an oblique portion of said tube, flattening said end, removing a substantial longitudinal portion of said flattened end leaving one longitudinal edge thereof, also removing one side of said oblique portion of said tube to form an opening and bending the end of said edge to the shape of a hook with the tip of said hook pointing towards said opening.

3. A method of manufacturing a machine knitting needle, comprising the steps of flattening one end of a tube, removing a substantial longitudinal portion of the flattened end of said tube leaving one longitudinal edge of said flattened end, grinding one side of said tube at the junction between the main body thereof and said flattened end so as to form an opening in said tube, and bending said edge to the shape of a hook with the tip of said hook pointing towards said opening.

4. A method of manufacturing a machine knitting needle, comprising the steps of flattening one end of a tube, removing a substantial longitudinal portion of said flattened end leaving one longitudinal edge of said flattened end, grinding one side of said tube close to the juncture between said edge and said tube so as to form an opening at one side of said tube, polishing said tube in the vicinity of said opening, and bending said edge to the shape of a hook with the tip of said hook pointing towards said opening.

5. A method of manufacturing a machine knitting needle, comprising the steps of flattening one end of a tube, removing a substantial portion of the flattened end leaving a portion thereof adapted to provide a hook, and also removing one side of the portion of said tube joining the main body thereof to said hook providing portion so as to form an opening in said side for the passage of a member through said tube to cover the hook.

6. A method of manufacturing a machine knitting needle, comprising the steps of bending a tube so that one end of said tube lies on one side of and parallel with the main body of said tube, said end being joined to said main body by an oblique portion of said tube, flattening said end, removing a substantial longitudinal portion of said end so as to leave one edge thereof, grinding said oblique portion so as to form an opening therein, and bending said edge to the shape of a hook having its tip substantially in alignment with the axis of the main body of said tube, said opening being formed on the side of said oblique portion nearest the tip of said hook.

7. A machine for manufacturing machine knitting needles, said machine comprising, in combination, a unit for flattening one end of a tube, a unit for shearing said flattened end so as to remove a substantial portion thereof but to leave a longitudinal edge thereof, a grinding unit for forming an opening in said tube, a unit for forming a hook at the end of said longitudinal edge, and means for carrying a tube in steps to said units in succession to be acted on thereby.

8. A machine for manufacturing machine knitting needles, said machine comprising, in combination, a unit for flattening one end of a tube, a unit for shearing said flattened end so as to remove a substantial portion thereof but to leave a longitudinal edge thereof, a grinding unit for forming an opening in said tube, a polishing unit for polishing said tube in the vicinity of said opening, a unit for forming a hook at the end of said longitudinal edge, and means for carrying a tube in steps to said units in succession to be acted on thereby.

9. A machine for manufacturing machine knitting needles comprising, in combination, a unit for bending and flattening one end of a tube, said unit including an anvil, dies, means for causing said dies to close on the end of said tube, while lying over said anvil, to offset said end, a further die, and means for causing said further die to descend on and flatten said offset end, the machine further comprising a unit for shearing said flattened end so as to remove a substantial portion thereof but to leave a longitudinal edge thereof, a grinding unit for forming an opening in one side of said tube close to said longitudinal edge, a unit for forming a hook at the free end of said longitudinal edge, and means for carrying a tube in steps to said four units in succession to be acted on thereby.

10. A machine for manufacturing machine knitting needles, said machine including, in combination, a unit for flattening one end of a tube, a unit for shearing said flattened end so as to remove a substantial portion thereof but to leave a longitudinal edge thereof, said shearing unit including an anvil, means for clamping on said anvil the edge of said flattened end opposite said first mentioned edge, a shear member, and means for actuating said shear member to remove said portion of said flattened end, the machine further comprising a unit for forming an opening in one side of said tube close to said longitudinal edge, a unit for forming a hook at the end of said first mentioned edge, and means for carrying a tube in steps to said units in succession to be acted on thereby.

11. A machine for manufacturing machine knitting needles, said machine including, in combination, a unit for flattening one end of a tube, a unit for shearing said flattened end so as to remove a substantial portion thereof but to leave a longitudinal edge thereof, a grinding unit for forming an opening at one side of said tube close to said longitudinal edge, said grinding unit comprising means for gripping the tube, with the portion to be ground exposed, a grinding wheel, means for supporting said grinding wheel, means for rotating said grinding wheel, and means for moving said supporting means to-and-fro over said portion to be ground, the machine further including a unit for forming a hook at the end of said longitudinal edge, and means for carrying a tube in steps to said four units in succession to be acted on thereby.

12. A machine for manufacturing machine knitting needles, said machine including, in combination, a unit for flattening one end of a tube, a unit for shearing said flattened end so as to remove a substantial portion thereof, but to leave a longitudinal edge thereof, a grinding unit for forming an opening in said tube, a unit for forming a hook at the end of said longitudinal edge, said hook forming unit comprising a rotary device arranged to lie beneath said longitudinal edge, a pin reciprocable towards and away from said rotary device, and means for turning said rotary device so as to engage and bend said longitudinal edge round said pin, the machine further including means for carrying a tube in steps to said four units in succession to be acted on thereby.

13. A machine for manufacturing machine knitting needles, said machine comprising, in combination, a unit for flattening one end of a tube, a unit for shearing said flattened end so as to remove a substantial portion thereof but to leave a longitudinal edge thereof, a grinding unit for forming an opening in one side of said tube close to said longitudinal edge, a unit for forming a hook at the end of said longitudinal edge, and means, including a number of spaced vices, for carrying tubes in succession and in step-by-step fashion to the four said units.

14. A machine for manufacturing machine knitting needles, said machine comprising, in combination, a unit for flattening one end of a tube, a unit for shearing said flattened end so as to remove a substantial portion thereof but to leave a longitudinal edge thereof, a grinding unit for forming an opening in one side of said tube close to said longitudinal edge, a unit for forming a hook at the end of said longitudinal edge, and means including a number of spaced vices for carrying tubes in succession and in step-by-step fashion to the four said units, each said vice including a slide whereby, on registering with any one of said units, the tube may be moved towards the unit in a direction transverse to the direction of travel of the vices to the several units.

HENRY WINTON DONISTHORPE.